United States Patent [19]

Loeffler

[11] 4,342,623

[45] Aug. 3, 1982

[54] PORTABLE WATER DISTILLER

[75] Inventor: Herbert H. Loeffler, Arlington, Mass.

[73] Assignee: Arthur D. Little, Inc., Cambridge, Mass.

[21] Appl. No.: 193,011

[22] Filed: Oct. 2, 1980

[51] Int. Cl.³ .............................................. B01D 3/02
[52] U.S. Cl. ................................ 202/83; 202/185 K; 202/190; 202/206; 203/10
[58] Field of Search ............... 202/163, 165, 166, 167, 202/182, 83, 185 R, 185 B, 185 D, 188, 189, 190–196, 206, 235, 232; 203/10, DIG. 16, DIG. 17, 100, 99

[56] References Cited

U.S. PATENT DOCUMENTS 1,440,199 12/1922 Wissing ........................... 202/185 D
2,254,538 9/1941 Newman ............................. 202/193
4,052,267 10/1977 McFee ............................. 202/185 B Primary Examiner—Frank Sever
Attorney, Agent, or Firm—Wolf, Greenfield & Sacks

[57] ABSTRACT

A portable water distiller having an insulated container for raw water and a removable cover for the container with a low pressure seal which engages the container wall. A condenser coil is provided in the cover along with a motor-driven fan, and inlet and outlet ports are provided about the periphery of the cover to allow cooling air to be drawn into the cover over the condenser coils and motor. An inlet tube connected to the condenser coil receives steam from the container generated by a heater connected to the container bottom.

2 Claims, 5 Drawing Figures

PORTABLE WATER DISTILLER

INTRODUCTION

This invention relates to portable water distillers and more particularly is an improvement over the water distiller shown in U.S. Pat. No. 4,052,267 dated Oct. 4, 1977.

It has long been recognized that in many communities drinking water has an unpleasant taste due to chlorine or minerals or suspended vegetable matter. Such water may also contain chemicals, bacteria or viruses believed to endanger health. This condition which has been widely publicized in recent years has become much more acute due to chemical wastes. In some communities residents will not drink the water and have either resorted to purchasing distilled water at retail, which is generally expensive, or have installed their own distillers.

U.S. Pat. No. 4,052,267 discloses several portable distillers designed for home use and having many desirable qualities. The present invention is an improvement over the embodiments shown in that patent, in that it provides a more efficient means of generating steam; it includes a more efficient condenser assembly; it has improved safety features which prevent the cover from blowing off when excess pressures are created; and it is "drape proof" in that no openings are provided in the cover top through which material may be sucked or dropped into the device.

The water distiller of the present invention includes among its features an air insulated main container in which the raw water is boiled. The insulation retards condensing action within the container on its side walls and thereby improves its efficiency. All of the steam generated in the container is carried to the condenser coil in the cover.

The cover, which houses not only the condenser coil but the motor and fan, includes openings in its side wall and a baffle arrangement in its interior which preferably causes the coldest air to pass over the coolest part of the condenser coil and the somewhat warmer air to pass over the hottest portion of the condenser coil. The top wall of the cover is free of openings through which draperies or other foreign matter may be dropped or sucked into the cover by the action of the fan.

The cover carries a gasket that forms a seal against the inner surface of the container, and the gasket is so designed as to form a low friction fit with the container. Consequently, any substantial pressure build-up in the container will cause the cover to unseat and relieve the container pressure. It is not possible for very substantial pressure to build up in the container, which could cause the cover to blow off the container.

This invention will be better understood and appreciated from the following detailed description of one embodiment thereof, selected for purposes of illustration and shown in the accompanying drawings.

BRIEF FIGURE DESCRIPTION

DETAILED DESCRIPTION OF THE DRAWINGS

Figure 1:
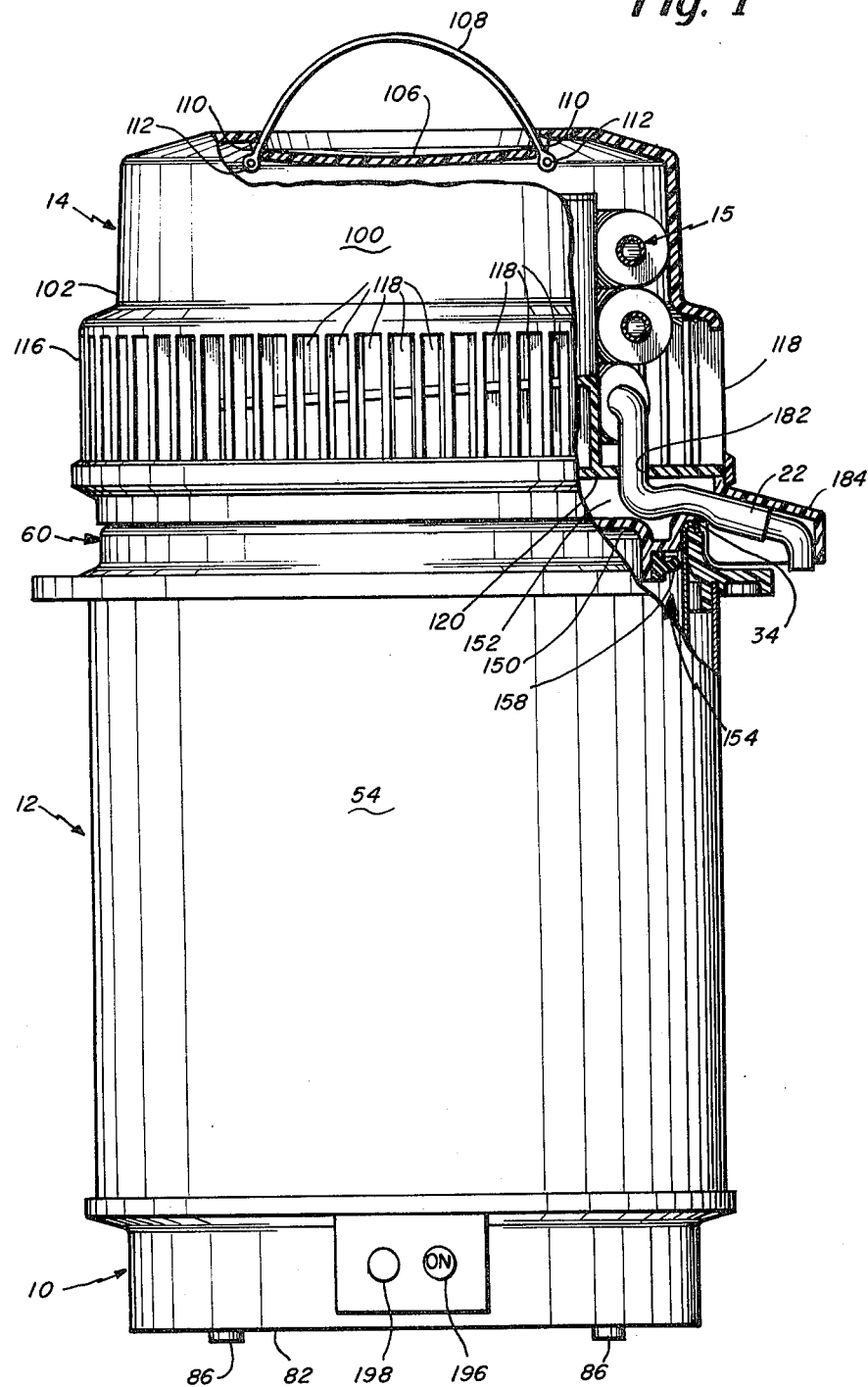
FIG. 1 is a front elevation view, partially broken away, of a water distiller constructed in accordance with this invention.

The water distiller shown in the drawing includes a base 10, a container 12 that receives the raw water, and a cover 14 that houses a condenser coil 15, motor 16 and fan 18 for condensing the steam generated in the container 12. A heater 19 connected to the bottom of the container 12 and disposed in the base 10 generates the steam in the container, and a tube 20 conveys the steam from the container to the condenser coil. The distilled water is discharged from the condenser coil through the discharge tube 22.

Figure 4:
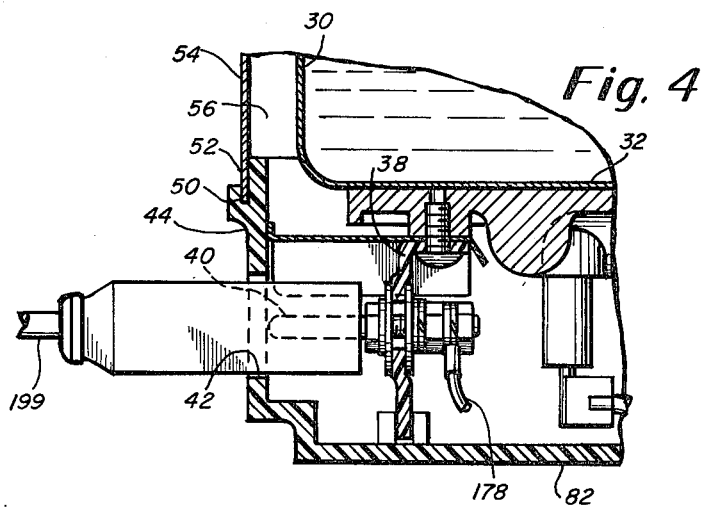
FIG. 4 is a fragmentary cross sectional view taken along the section line 4—4 of FIG. 2.

The container 12, which may be made of stainless steel or some other similar non-corrosive material, has a cylindrical side wall 30 and a flat bottom wall 32. The upper edge of the wall 30 has a rolled rim 34. Bottom wall 32 carries a cast aluminum heating element 36 in intimate contact with substantially the entire lower surface of bottom wall 32 so as to be in good heat conducting relationship with it. The heating element as shown in FIG. 4 is connected by means of a terminal bracket 38 to terminal 40 which is accessible through an opening 42 in the side wall 44 of the base. Terminal 40 is designed to accept a conventional power supply cord which in turn is plugged into a convenient A/C outlet.

The upper edge of cylindrical wall 44 of the base is provided with an annular recess 50 which receives the lower edge 52 of container shell 54. The shell 54 is in the form of a cylindrical sleeve which surrounds the container 12 to define an annular air-filled insulating chamber 56 about the container. While solid insulation such as an expanded plastic or fiber glass may be packed into the chamber 56 to further enhance the insulation of the container, that does not appear to be necessary, as the air space provides adequate insulation.

A molded plastic ring 60 having downwardly extending inner and outer flanges 62 and 64 that form an annular recess 66 which receives the upper edge 68 of shell 54, also has an upwardly extending shoulder 70 that supports the container 12 by underlying the rolled rim 34 of the container. Ring 60 is permanently sealed to the rim 34 as well as to the upper edge 68 of the shell 54 so as to close the annular chamber 56.

Base 10 has a recess 80 provided in its bottom wall 82, and a threaded stud 84 secured in the recess 80 also engages the threaded hole in the center of heater 19 to rigidify the assembly comprising the base 10, container 12, shell 54 and ring 60. The bottom wall 82 is provided with feet 86 to support the assembly on a flat surface such as a counter top. The feet serve to space the main portion of the bottom wall 82 above the surface. The bottom wall 82 of the base also defines an air chamber 90 below the heating element 19 so as to further insulate the container 12.

Cover 14 includes a generally cylindrical molded plastic shell 100 having a side wall 102 and a top wall 104. A finger recess 106 is provided in the central area of the top wall 104, and a flexible band handle 108 spans the recess 106 with its ends 110 extending through the recess side walls. The ends 110 of the handle are enlarged as shown at 112 to prevent the handle from being pulled out of the cover. When the cover is carried by the handle, the band is raised above the recess 106 to form a bail-like handle, and the enlarged ends 112 bear against the inner surface of the recess side wall. The lower portion 116 of cylindrical side wall 102 has a somewhat increased diameter, and it is provided with a series of openings 118 through the side wall about its entire periphery, which provide air passages to and from the interior of the cover.

The bottom of the cover is closed by a plate 120 that spans the lower end of the shell 100, and the plate 120 carries an upwardly extending cylindrical partition 122 that divides the interior of the cover into an inner cylindrical chamber 124 and an outer annular chamber 126. Chamber 124 contains motor 16 mounted on plate 120 and fan 18 carried on the upper end of motor shaft 134. Coiled condenser tube 15 carrying closely spaced fins 142 is wound about the outer surface of partition 122 in the annular chamber 126. The openings 118 in the shell 100 communicate with the annular space 126 to allow air to enter the cover 14. An outlet 144 is formed in the partition 122, as shown in FIGS. 2 and 3, to allow air to exit from the chamber 124 through the openings 118 about a portion of the circumference of the cover.

Figure 3:
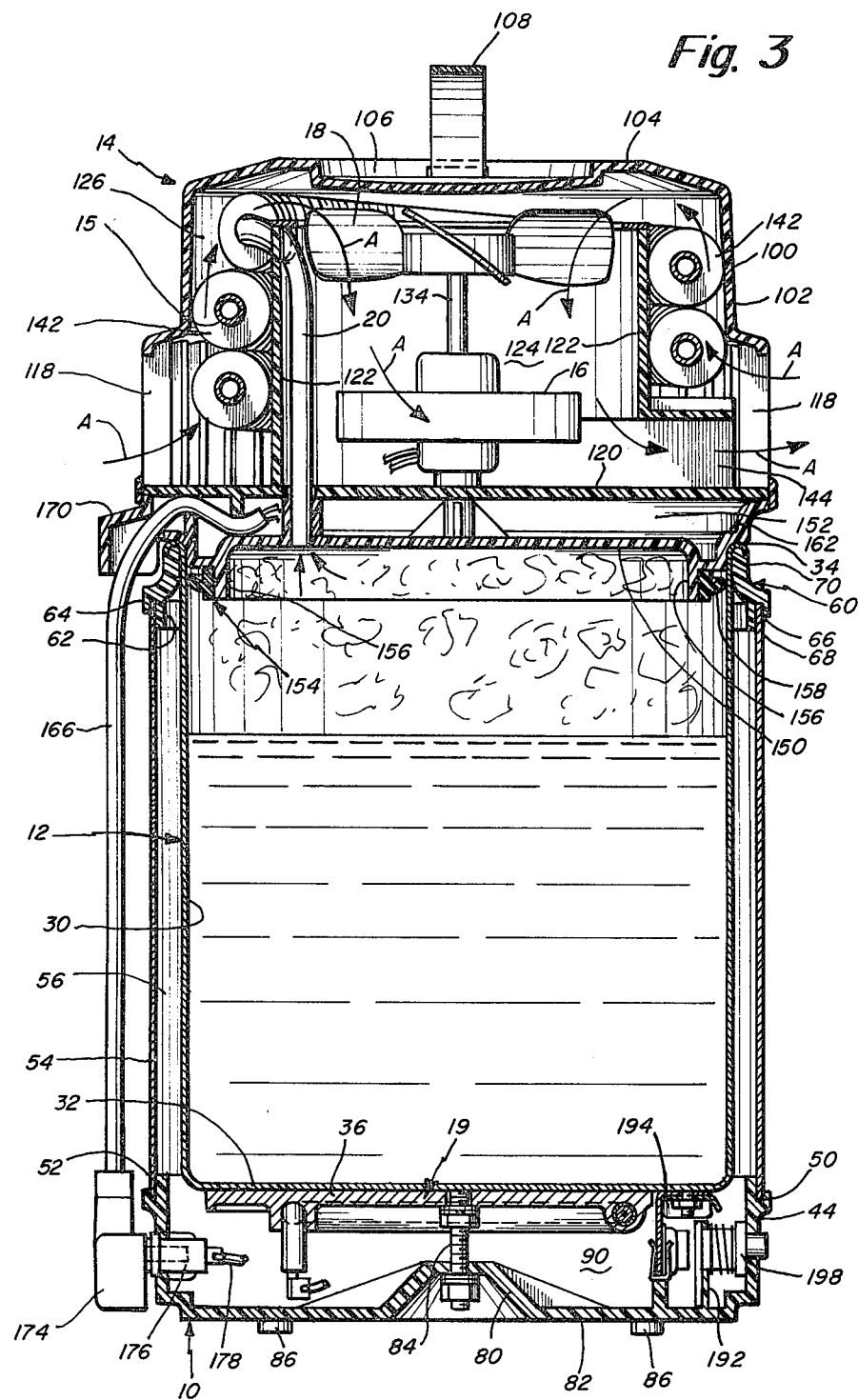
FIG. 3 is a cross sectional view taken along the section line 3—3 of FIG. 2.
Figure 5:
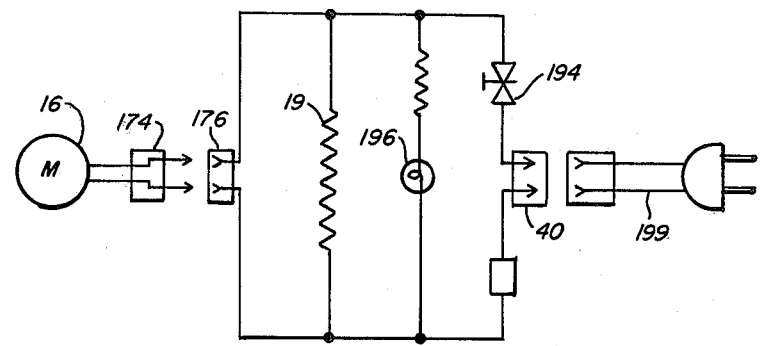
FIG. 5 is a schematic diagram of the electrical circuit for the distiller.

As shown in FIGS. 1 and 3, cover 14 carries a bottom closure 150 beneath plate 120, and the closure 150 and plate 120 define an air-filled insulation chamber 152 over the container 12 when the cover is in the closed position. Closure 150 carries a sealing gasket 154 on the outer surface of its downwardly extending flange 156, and gasket 154 includes a flexible tongue 158 which bears against the inner surface of the cylindrical wall 30 of container 12 to form a soft seal for the container. The soft or low friction seal defined by the gasket against the inner surface of the container prevents excessive build up of pressure in the container which could ultimately explode the cover off the container. When excessive pressure builds up in container 12, the gasket will allow the cover to elevate so as to open the container and relieve the internal pressure.

Closure 150 also includes an outwardly extending flange 162 which is curved on its lower side generally to conform with the curvature of the rolled rim 34 of container 12. The flange 162 serves as a stop or support for the cover when it is mounted in place on the container.

Figure 2:
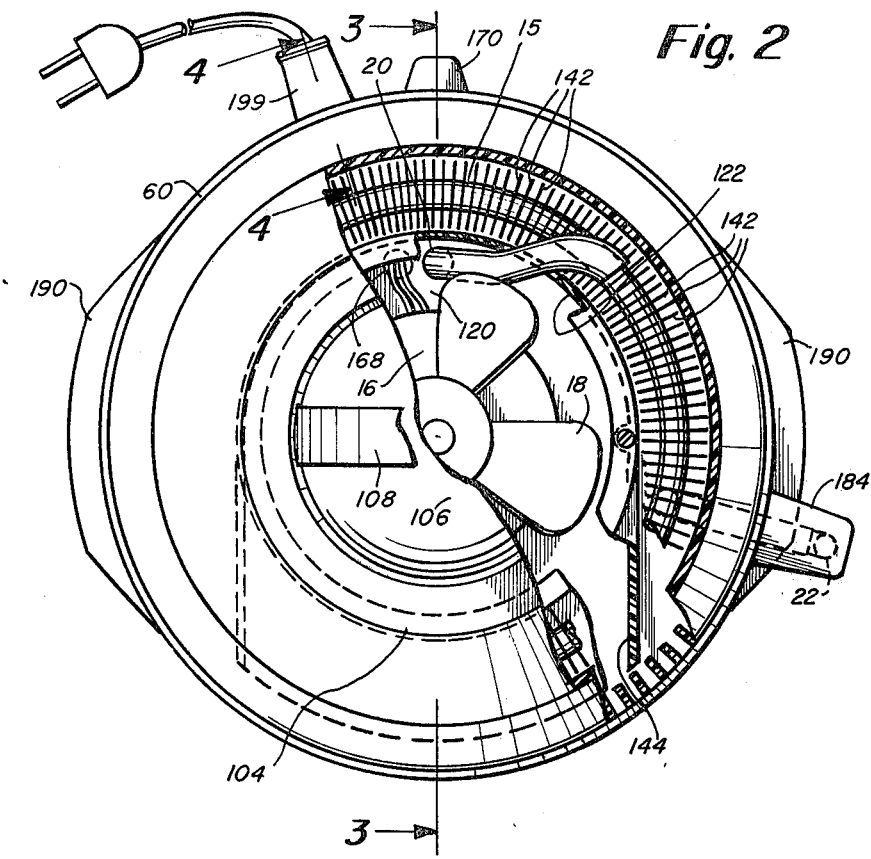
FIG. 2 is a top plan view, partially broken away of the distiller shown in FIG. 1.

As shown in FIGS. 2 and 3, the coil of motor 16 is wired to a down cord 166 through an opening 168 in plate 120. Down cord 166 extends out of chamber 152 through the protective cover 170 connected to shell 100. Down cord 166 carries a plug 174 at its lower end which is adapted to be connected to the receptacle 176 in base 10 which in turn is electrically connected to terminal 40 by internal wiring 178. As is explained more fully below, the operator can, when desired, disconnect the down cord 166 from the outler 176 so as to de-energize the motor 16 and deactivate the fan 18.

Steam in container 30 is conveyed to the condenser coil 15 by the tube 20 which extends from the top of the coil downwardly within the cover 14 through plate 120 and bottom closure 150 of the cover. As is evident in FIG. 3, the lower end of tube 20 terminates above the bottom of flange 156 of the bottom closure so that it does not interfere with the placement of the cover when removed from the container on a flat surface. That is, with the exception of the down cord 166, which itself is flexible and therefore does not interfere with the placement of the cover on a flat surface, the lowest extremity of the cover is the lower end of flange 156 that is designed to provide a stable support for the cover which will not mar the surface on which it is placed.

Discharge tube 22 which is connected to the lower end of the condenser coil 15 extends through an opening 182 in plate 120 and out the chamber 152 beneath the protective cover 184 connected to shell 100. The protective covers 170 and 184 are part of a ring 186 connected directly to the shell.

As is shown in FIG. 2, ring 60 is enlarged at opposite sides of the assembled distiller to provide convenient handles 190 for carrying the unit about. The protective cover 184 and its enclosed discharge tube 22 extend radially beyond the handles 190 so that the handles themselves do not interfere with the discharge of distilled water from the assembly.

In FIG. 3 a bracket 192 is shown mounted in base 10 and carries a thermostat 194 mounted to sense the temperature of the bottom of container 12. Thermostat 194 is in circuit with the heater 19 and fan motor 16 so as to shut off the system when the temperature at the bottom of the container rises above a preset value. Also disposed on the base 10 is a pilot light 196 which is lighted whenever the distiller is on and a reset button 198 which is in the circuit of the thermostat 194. When the thermostat is opened in response to excessive heat at the base of the container, the distiller may not again be put in operation until the restart button 198 is depressed.

When it is desired to produce distilled water, the user removes the cover 14 from the bottom assembly by means of the convenient handle 108 and places the cover on the counter. The bottom assembly may be carried to the sink by means of the carrying handles 190, and domestic water may be introduced to the container directly from the faucet, or a pitcher may be used to fill the container 12 with the raw water. The user then mounts the cover on the container with gasket 154 forming a soft seal with the container inner surface, plugs the down cord 166 into the receptacle 176 of the base, and plugs the power supply 199 cord onto the terminal 40 and into the convenient wall socket. With the cord plugged in, the heating element 19 will quickly cause the water in the container 12 to boil, and the steam which rises off the surface of the water in the container will flow upwardly through the inlet pipe 20 and enter the condenser coil 15 at the upper end of the coil. The fan 18 which will rotate upon plugging the power cord into the outlet will draw air into the cover through the openings 118, and the air will flow upwardly in the annular chamber 126 over the coils and then turn downwardly through the fan in the inner chamber 124, pass over the motor 16 and leave the cover through the outlet passage 144. The flow path of the air through the cover is suggested by the arrows A in FIG. 3. The steam which enters the condenser coil 15 will condense on the inner walls of the coil, and the condensed water will flow through the helix of the coil and discharge through the outlet tube 22. Because the container 12 is so effectively insulated by the air chambers on all sides of the container, little or no condensation of the steam will occur on the container walls but rather the boiled water will remain as vapor in the container and rise through the tube 20 to the condenser. The distiller may be left in operation until such time as it automatically shuts off in response to excessively high temperatures sensed by the thermostat 194, which occurs when all the water in the container is boiled away. If the distiller is shut down by action of the thermostat, the device may not again be placed in use until additional water is supplied to the container and the restart button 198 is depressed.

It will be appreciated that the cover may be removed at any time by unplugging the plug 174 at the bottom of drop cord 166 from terminal 176. With the drop cord unplugged, the unit can be used as a conventional electrically heated container for boiling water or any other material with or without the cover in place.

One of the advantages of the present invention is the absence of any stack or bubble catcher connected to the cover such as is shown in U.S. Pat. No. 4,052,267. Because of the absence of any stack, the cover can be set down on a flat surface. Another advantage of the present invention is that the surface heater 19 operates more effectively than an immersion heater, for it provides a larger area so as to reduce the watt density of the heater. And because the container itself is provided with substantial insulation, the distiller operates more efficiently.

The low friction seal between the cover and the container prevents blow off of the cover, which is an added safety feature of the present invention. In addition, the absence of any air openings in the top surface of the cover prevents extraneous material from entering the cover. Furthermore, it allows the unit to be placed under a counter without interference with the flow of air through the cover to operate the condenser. Another advantage of the present invention is the relationship of the flow of cooling air over the condenser coils to the temperature of the coils themselves. It will be noted that in the preferred embodiment shown, the coil is hottest at the top, and the cooler air enters the annular chamber 126 and first contacts the cooler end of the coil. Thus, the maximum temperature gradient is produced for the most efficient operation. While the air flow is preferred in the direction suggested by arrows A, it will be appreciated that the direction of flow may be reversed by changing the pitch of the blades of the fan 18.

The operation of the distiller may be enhanced by introducing stainless steel wool or some other material into the discharge tube 22. The stainless steel wool would create a labyrinth effect in the outlet to assure that no steam is discharged through the tube 22.

From the foregoing description, those skilled in the art will appreciate that numerous modifications may be made of this invention without departing from its spirit. Therefore, it is not intended that the breadth of this invention be limited to the specific embodiment illustrated and described. Rather, it is intended that the scope of the invention be limited by the appended claims and their equivalents.

What is claimed is:

1. A water distiller comprising:
   a container for receiving raw water and a base for supporting the container on a flat surface,
   a heating plate secured to the bottom of the container for boiling raw water in the container,
   a shell spaced from and surrounding the container and defining with the container an insulating chamber about the container,
   a cover having a bottom wall for closing the container when the cover is mounted on the top of the container, said cover having an imperforate top wall for preventing extraneous matter from falling into it from above, said top wall being spaced from said bottom wall to define an insulating chamber above the container when said cover is on the container,
   a partition mounted in the cover and spaced from the outer wall of the cover to define an outer chamber and an inner chamber in the cover,
   openings in the cover sidewall communicating with the outer chamber and the inner chamber to allow air to flow in series through the chambers,
   a condenser coil disposed in the outer chamber,
   a discharge tube that extends out the cover connected to the bottom of the coil,
   means for eliminating the requirement of a bubble catcher including:
      a gasket carried in said bottom wall of said cover that forms a low pressure seal for the container by bearing against the inner surface of the wall of the container,
      and an inlet tube mounted in the cover and having one end connected to the top of the condenser coil and the other end extending through the cover bottom wall and communicating with the top of the container so that steam may rise in the inlet tube and flow into the condenser coil when the cover is on the container and the heating plate is energized to boil water in the container, said other end of the inlet tube lying above the lowest portion of the cover bottom wall so that the cover can be placed upright on a flat surface,
   and a motor and fan disposed in the inner chamber of the cover for causing outside air to be drawn through the openings into the cover and over the condenser coil and motor and out the openings.

2. A water distiller as defined in claim 1 further characterized by said inlet tube being open to the entire surface of the raw water in the container.

* * * * *